Jan. 14, 1930.   J. W. MORRISON   1,743,614
MOUSE TRAP
Filed March 26, 1928

Inventor
John W. Morrison,

By Clarence A. O'Brien
Attorney

Patented Jan. 14, 1930

1,743,614

UNITED STATES PATENT OFFICE

JOHN WILLIAM MORRISON, OF LAKEPORT, CALIFORNIA

MOUSE TRAP

Application filed March 26, 1928. Serial No. 264,885.

The present invention relates to a mouse trap and has for its prime object to provide a structure incorporated as part of a lid for a container.

Another very important object of the invention resides in the provision of a mouse trap of this nature which is exceedingly simple in its construction, inexpensive to manufacture, strong and durable, easy to manipulate, thoroughly efficient and reliable in operation, not likely to easily become out of order and otherwise well adapted to the purpose for which it is designed.

With the above and numerous other objects in view as will appear as the description proceeds, the invention resides in certain novel features of construction, in the combination and arrangement of parts as will be hereinafter more fully described and claimed.

Figure 1:
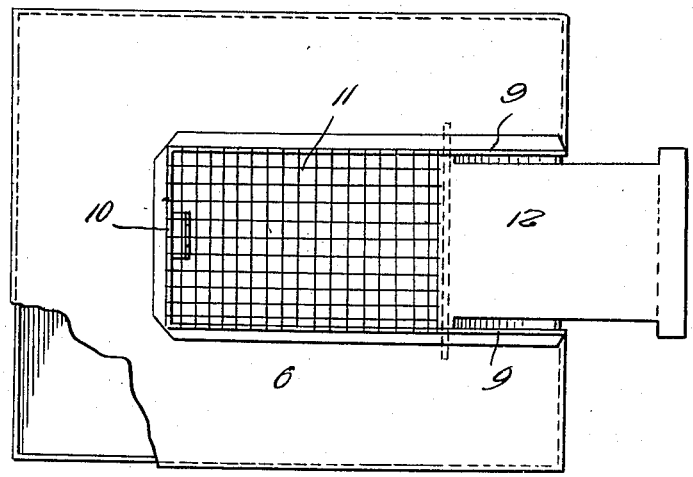
Figure 1 is a top plan view of the trap embodying the features of my invention showing one corner of the lid broken away.

Referring to the drawing in detail it will be seen that the numeral 5 denotes a receptacle of any preferred construction having a lid with the body portion 6 and a marginal depending flange 7 to extend about the upper portion of the side walls of the receptacle 5. The body portion 6 of the lid is provided with an elongated opening 8 extending inwardly from one edge thereof.

Walls 9 rise from the longitudinal edges of the opening 8 and a wall 10 rising from the inner transverse edge thereof. A foraminous sheet of screen material or the like is stretched across the major portion of the upper edges of the side walls 9 and the upper edge of the end wall 10. The upper edges of the side walls 9 incline downwardly from the end wall 10. The body 6 is provided intermediate its ends with depending stop ears 15 and a pair of bearings 16 one adjacent each stop ear 15 and inwardly thereof for receiving the ends of a trunnion pin 17 secured transversely along the under face of an intermediate portion of the trap door 12.

This trap door 12 closes the opening 8 and adjacent the opening is wider than the opening to abut the bottom surface of the body 6 to one side of the pin while the other side of the pin of this trap door is narrower than the opening so that it may move upwardly as clearly indicated in Figure 1. The narrow portion of the trap door extends beyond the end of the receptacle and has its outer end transversely enlarged and on this transversely enlarged outer end portion there is mounted a counterbalanced bar 20, so that the trap door is normally closed.

Figure 2:
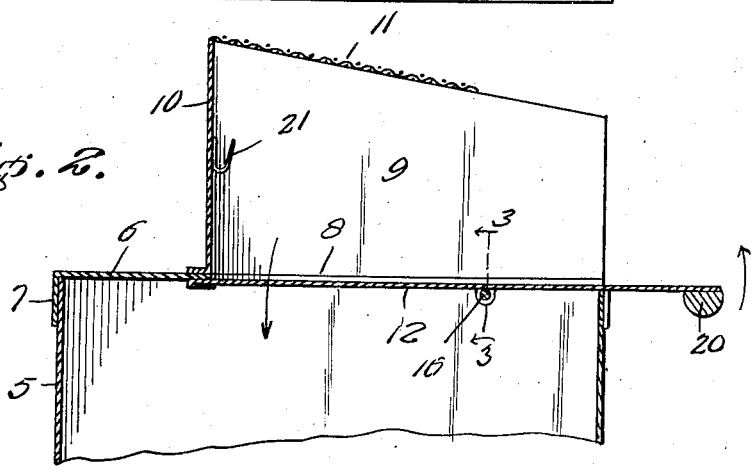
Figure 2 is a vertical longitudinal section therethrough.
Figure 3:
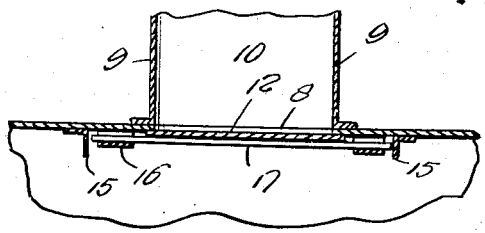
Figure 3 is a fragmentary vertical transverse section therethrough taken substantially on the line 3—3 of Figure 2.

On the wall 10 there is mounted a bait hook 21. From the above detailed description it will be seen that when a mouse or any other animal, depending upon the size of the trap, is attracted by the bait on hook 21 the animal enters between the walls 9 on the trap door 12 and when the weight of the animal overcomes the counterbalance bar 20 and the narrower portion of the trap door, said trap door will rock in the direction of the arrow shown in Figure 2 so that the animal will drop into the receptacle 5 and the trap door will rock back in its closed position as clearly shown in Figure 2.

It is thought that the construction, utility and advantages of this invention will now be quite apparent to those skilled in this art without a more detailed description thereof. The present embodiment of the invention has been disclosed in detail for the purpose of exemplification and it is to be understood that changes in the details of construction, and in the combination and arrangement of parts may be resorted to without departing from the spirit or scope of the invention as hereinafter claimed or sacrificing any of its advantages.

Having thus described my invention, what I claim as new is:

In combination, a lid having a body provided with an oblong opening extending inwardly from one end thereof, walls rising from the lid along the side of the opening and a wall rising from the lid along the end of the opening remote from said end of the body, a bait hook on the inner surface of said end wall, a trap door, means for rockably mounting the door intermediate its ends on an axis across said opening, the inner portion of the trap door to one side of said means being wider than the other portion thereof and said opening so that the wider portion will abut the lid when in a closed position, said other portion of the door extending outwardly beyond said end of the body and having its extremity widened to abut the edges of the first mentioned walls when the door is rocked to an open position.

In testimony whereof I have affixed my signature.

JOHN WILLIAM MORRISON.